US012581579B2

(12) United States Patent
Krajnc et al.

(10) Patent No.: US 12,581,579 B2
(45) Date of Patent: Mar. 17, 2026

(54) PREVENTING OR LIMITING CONTROL OF A FIRST LIGHTING SYSTEM BY A SECOND LIGHTING SYSTEM

(71) Applicant: SIGNIFY HOLDING B.V., Eindhoven (NL)

(72) Inventors: Hugo José Krajnc, Eindhoven (NL); Tobias Georg Tolle, Beerse (BE)

(73) Assignee: SIGNIFY HOLDING B.V., Eindhoven (NL)

(*) Notice: Subject to any disclaimer, the term of this patent is extended or adjusted under 35 U.S.C. 154(b) by 67 days.

(21) Appl. No.: 18/729,963

(22) PCT Filed: Jan. 17, 2023

(86) PCT No.: PCT/EP2023/051004
§ 371 (c)(1),
(2) Date: Jul. 18, 2024

(87) PCT Pub. No.: WO2023/139060
PCT Pub. Date: Jul. 27, 2023

(65) Prior Publication Data

US 2025/0119996 A1 Apr. 10, 2025

(30) Foreign Application Priority Data

Jan. 18, 2022 (EP) .................................... 22151966

(51) Int. Cl.
*H05B 47/10* (2020.01)
*H05B 45/50* (2022.01)
(Continued)

(52) U.S. Cl.
CPC ............. *H05B 45/50* (2020.01); *H05B 47/19* (2020.01); *H05B 47/196* (2024.01); *H05B 47/1985* (2024.01)

(58) Field of Classification Search
CPC ........ H05B 45/10; H05B 45/50; H05B 47/10; H05B 47/19; H05B 47/196; H05B 47/1985
See application file for complete search history.

(56) References Cited

U.S. PATENT DOCUMENTS

2013/0207550 A1* 8/2013 Nishio .................. G05D 25/02 315/151
2017/0288892 A1 10/2017 Hunt et al.
2019/0306003 A1 10/2019 Maruyama

FOREIGN PATENT DOCUMENTS

CA 2559153 C * 10/2018 .......... H04L 67/025
FR 3038480 A1 1/2017

OTHER PUBLICATIONS

Phan, Linh-An, et al., "Breaking Down the Compatibility Problem in Smart Homes: A Dynamically Updatable Gateway Platform," Sensors, MDPI, School of Information and Communication Engineering, Cungbuk National University, Cheongju, Korea, May 2020 (19 Pages).

* cited by examiner

*Primary Examiner* — Jimmy T Vu

(57) ABSTRACT

A system (1) for preventing or limiting control of a lighting device (31-33) in a first connected lighting system (41) is configured to determine a current or expected state of the lighting device, determine control permissions based on the current or expected state of the lighting device, and prevent or limit control of the lighting device by a second connected lighting system (42) located in a same building as the first connected lighting system in dependence on the control permissions.

15 Claims, 4 Drawing Sheets

(51) Int. Cl.
*H05B 47/175* (2020.01)
*H05B 47/19* (2020.01)

PREVENTING OR LIMITING CONTROL OF A FIRST LIGHTING SYSTEM BY A SECOND LIGHTING SYSTEM

CROSS-REFERENCE TO PRIOR APPLICATIONS

This application is the U.S. National Phase application under 35 U.S.C. § 371 of International Application No. PCT/EP2023/051004, filed on Jan. 17, 2023, which claims the benefit of European Patent Application No. 22151966.3, filed on Jan. 18, 2022. These applications are hereby incorporated by reference herein.

FIELD OF THE INVENTION

The invention relates to a system for preventing or limiting control of a lighting device in a first connected lighting system.

The invention further relates to a method of preventing or limiting control of a lighting device in a first connected lighting system.

The invention also relates to a computer program product enabling a computer system to perform such a method.

BACKGROUND OF THE INVENTION

Smart home systems are becoming increasingly popular, covering multiple use cases or domains like lighting, temperature control, security monitoring, and general appliance controls. However, this presents a dilemma: systems that want to cover as many of these domains (becoming the leading supplier for the full smart home) most likely do not have enough capabilities to address specific corner cases of each individual domain, whereas companies that want to focus on a single system to address in-depth issues on those propositions probably cannot afford to develop products and features for other domains.

For example, Apple Homekit aims at being the system through which all accessories in a home can be controlled, whether it is lights, fans, plugs, or heating. However, when it comes to lighting, for example, Apple Homekit only supports basic features like on/off/dim/color change. On the other hand, Philips Hue offers many light specific features like extracting color settings from photos and synchronizing lights to content, but has no capability of controlling devices in other domains like heating or door locks.

As a result, it is expected that households will have a mixture of different systems, where each is selected and generally used due to some specific benefits that they provide to the user but cannot cover their full needs. A problem arises when these systems overlap on functionalities in certain areas or devices. This problem arises, for example, if Philips Hue lights have been installed to synchronize light effects with a TV via the entertainment feature, but in the same room, WiZ lights have been installed to provide general lighting since they were cheaper. In this case, each system chooses its own settings but these settings may conflict.

It may be possible to solve this problem by developing a gateway that supports many protocols and acts as a central controller for all smart devices in the home, as discussed in the paper "Breaking Down the Compatibility Problem in Smart Homes: A Dynamically Updatable Gateway Platform" by Linh-An Phan and Taehong Kim, published May 2020 in Sensors 20 (10):2783. This paper introduces a Device Profile Handler module which is capable of dynamically downloading and updating its device profiles every time a new device is connected to the gateway. A device profile is a file that contains information about the device (e.g., manufacturer or model name), its functions, and how it can be controlled.

A drawback of the approach suggested in the paper is that it only works properly if the required device profiles are available, which is not the case in the foreseeable future.

SUMMARY OF THE INVENTION

It is a first object of the invention to provide a system, which can be used to reduce or prevent conflicts between settings of two lighting systems in the same building without requiring a central controller.

It is a second object of the invention to provide a method, which can be used to reduce or prevent conflicts between settings of two lighting systems in the same building without requiring a central controller.

In a first aspect of the invention, a system for preventing or limiting control of a lighting device in a first connected lighting system comprises at least one processor configured to determine a current or expected state of said lighting device, determine control permissions based on said current or expected state of said lighting device, and prevent or limit control of said lighting device by a second connected lighting system located in a same building as said first connected lighting system in dependence on said control permissions.

By letting the second connected lighting system control the first connected lighting system, the second connected lighting system is enabled to reduce or prevent conflicts between settings of the two lighting systems without requiring a central controller (and thus a clear hierarchical relationship). However, it is often not desirable to allow the second connected lighting system to (always) change all settings of all lighting devices in the first connected lighting system. Therefore, the system makes it possible for the first connected lighting system not to have its own settings overruled by the second connected lighting system and thereby protect the first connected lighting system from being affected negatively and present a poorer user experience.

Said system may be part of said first connected lighting system, for example. Said second connected lighting system is located in the same building as said first connected lighting system when at least their lighting devices are located in the same building. A building may comprise multiple structures, e.g. a house and a garden shed, and/or outdoor areas like a garden.

Said current or expected state of said lighting device typically influences which kind of light effects said lighting device renders or will render. Said current or expected state of said lighting device may relate to its use. For example, said current or expected state of said lighting device may comprise said lighting device rendering light effects to accompany audio and/or video content being rendered on an audio and/or video rendering device or said lighting device rendering dynamic light effects, for example. In these cases, allowing the second connected lighting system to change the light settings of the lighting device would normally be disruptive.

Said at least one processor may be configured to temporarily prevent or temporarily limit control of said lighting device by said second connected lighting system in dependence on said control permissions. Alternatively or additionally, said at least one processor may be configured to prevent or limit control of said lighting device by said second connected lighting system in dependence on said control permissions for an indefinite time period.

Said at least one processor may be configured to prevent one or more characteristics of light effects rendered by said lighting device from being changed by said second connected lighting system in dependence on said control permissions. For example, said second connected lighting system may be allowed to change a color of said lighting device but not a dim level/brightness setting of said lighting device.

Said at least one processor may be configured to grant said second connected lighting system control of said lighting device in dependence on said control permissions, e.g. upon request by said second connected lighting system. For example, said at least one processor may be configured to temporarily grant said second connected lighting system control of said lighting device in dependence on said control permissions.

Said at least one processor may be configured to further prevent or limit control of said lighting device by one or more controlling devices in said first connected lighting system. For example, said at least one processor may be configured to grant said second connected lighting system exclusive control of said lighting device in dependence on said control permissions.

Examples of such a controlling device are a mobile device or an Internet server. A mobile device may be part of both the first connected lighting system and the second connected lighting system, e.g. if it runs a first software application for controlling lighting devices in the first connected lighting system and a second software application for controlling lighting devices in the second connected lighting system.

Said at least one processor may be configured determine said expected state of said lighting device from an automation defined in said first connected lighting system. The state of the lighting device may reflect that it is participating in a routine. For example, if the lighting device is used for a fall asleep routine or an alarm, control by other lighting systems may be prevented, as this would be disruptive. On the other hand, if the lighting device is used for a presence mimicking (security) routine, control by other lighting systems may be allowed, as this would not be disruptive.

Said at least one processor may be configured to determine an impact of a change from said current or expected future state to another state and determine said control permissions based on said determined impact of said change. The impact of a change to any other state or to a specific other state may be determined. For example, said at least one processor may be configured to receive a signal indicative of a desired state of said lighting device, said desired state being specified in a control command from said second connected lighting system, and determine said impact of said change by determining an impact of a change from said current or expected future state to said desired state.

The impact may depend on the automation for which the lighting device is used or the type of light effects being rendered on the lighting device. For example, changing a light setting when the lighting device is rendering entertainment or other dynamic light effects typically has more impact than changing a light setting when the lighting setting is rendering a static light scene. The impact typically depends on whether a user expects something to happen and/or whether and/or whether an event would not be reacted to. The impact may also depend on a difference in dim level/brightness, color, and/or intensity (e.g. dynamicity) between the current or expected state and the desired state.

Said at least one processor may be configured to determine a current or expected further state of a further lighting device in said first connected lighting system and determine said control permissions further based on said current or expected further state of said further lighting device. For example, if said further lighting device is rendering entertainment light effects and said lighting device and said further lighting device are located in the same room, said second connected lighting system may be prevented from controlling said lighting device.

In a second aspect of the invention, a method of preventing or limiting control of a lighting device in a first connected lighting system comprises determining a current or expected state of said lighting device, determining control permissions based on said current or expected state of said lighting device, and preventing or limiting control of said lighting device by a second connected lighting system located in a same building as said first connected lighting system in dependence on said control permissions. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for preventing or limiting control of a lighting device in a first connected lighting system.

The executable operations comprise determining a current or expected state of said lighting device, determining control permissions based on said current or expected state of said lighting device, and preventing or limiting control of said lighting device by a second connected lighting system located in a same building as said first connected lighting system in dependence on said control permissions.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
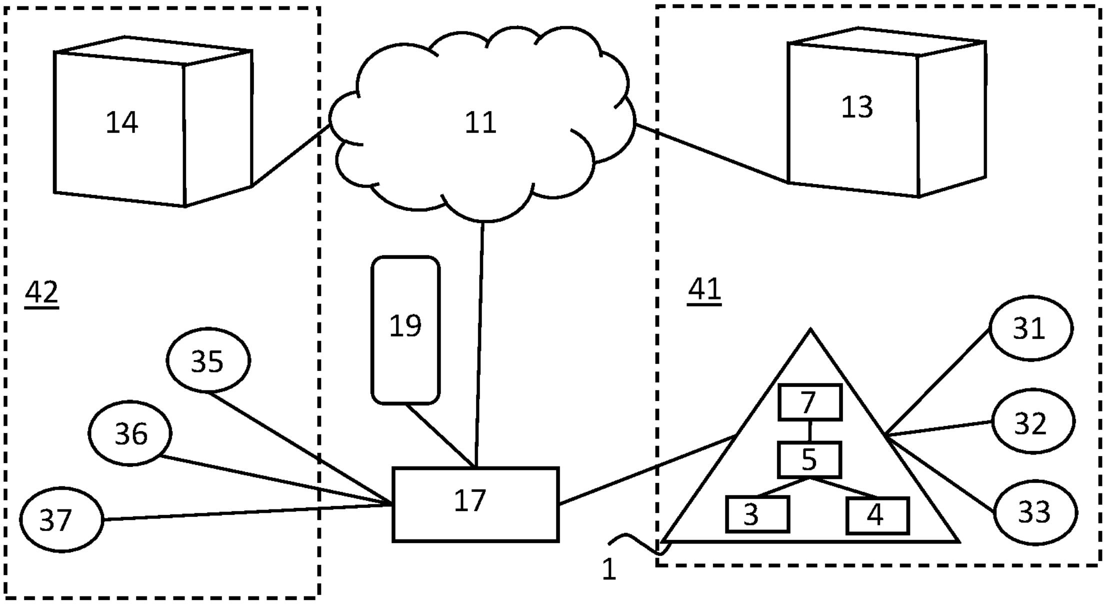
FIG. 1 is a block diagram of a first embodiment of the system.

FIG. 1 shows a first embodiment of the (control) system for preventing or limiting control of a lighting device in a first connected lighting system 41. The (control) system may be a single device or may comprise multiple devices. The (control) system is typically part of the first connected lighting system. In this first embodiment, the (control) system is a bridge 1. The bridge 1 may be a Philips Hue bridge, for example. In the example of FIG. 1, a first connected lighting system 41 comprises the bridge 1 and three lighting devices 31-33. The lighting devices 31-33 communicate with the bridge 1, e.g. using Zigbee technology. The lighting devices 31-33 may be Philips Hue lights, for example.

The bridge 1 is connected to a wireless LAN access point 17, e.g. via Ethernet or Wi-Fi. The wireless LAN access point 17 is connected to the Internet (backbone) 11. An Internet server 13 is also connected to the Internet (backbone) 11. A mobile device 19 is able to control the lighting devices 31-33 via the bridge 1. The mobile device 19 runs an app for controlling lighting devices 31-33, for example. Other smart home systems are able to control the lighting devices 31-33 via the Internet server 13 and the bridge 1.

In the example of FIG. 1, a second connected lighting system 42 comprises three lighting devices 35-37. The mobile device 19 runs an app for controlling lighting devices 35-37, for example. The mobile device 19 is able to control the lighting devices 35-37 via the wireless LAN access point 17, optionally via an Internet server 14. The Internet server 14 is also connected to the Internet (backbone) 11. The lighting devices 35-37 may be WiZ lights, for example. The lighting devices 35-37 may have slightly fewer features than lighting devices 31-33, e.g. they might not be capable of synchronizing lights to content. For example, lighting devices 35-37 may have a lower product pricing and may be meant for those users wishing to enter smart lighting for the first time. Other smart home systems are not able to control the lighting devices 35-37.

Each of lighting devices 31-33 and 35-37 comprises one or more light sources, e.g. LED modules. A lighting device may be powered while its one or more light sources are off. The second connected lighting system 42 is located in the same building as the first connected lighting system 41.

The bridge 1 comprises a receiver 3, a transmitter 4, a processor 5, and a memory 7. The processor 5 is configured to determine a current or expected state of the lighting devices 31-33, determine control permissions based on the current or expected state of the lighting devices 31-33, and prevent or limit control of the lighting device by the second connected lighting system 42 located in a same building as the first connected lighting system 41 in dependence on the control permissions.

Thus, there are two connected lighting systems in a common space and no higher ranked system (other than the user) controls those two systems. Instead, the two systems arbitrate themselves.

In the embodiment of FIG. 1, the bridge 1 runs an algorithm that operates continuously, such that it can determine at any time whether a change in access rights to certain settings is needed. A change may be necessary if a state of one or more of the lighting devices 31-33 has changed or is expected to change, e.g. due to expected events that are not taking place yet but are relatively certain to occur. Based on the current state or expected state of the lighting devices 31-33, the bridge 1 can determine how sensitive different settings of the lighting system 41 as a whole and those specific to each device in the lighting system 41 are. Sensitivity here refers to the likelihood that they generate a significant or observable impact in the user experience (e.g. visual artifacts, non-responsiveness, degradation of performance, etc.).

As an example, if the bridge 1 determines at a certain moment that the user has started the entertainment mode of lighting system 41, such that lighting device 31, e.g. a pixelated light strip, starts rendering light effects to accompany audio and/or video content being rendered on an audio and/or video rendering device, the following might happen:

- The algorithm running on the bridge 1 determines that changing the settings of the lighting device 31 in the living room, which is involved in rendering entertainment light effects, has a high user impact. Therefore, these settings are closed to any other smart home system, including lighting system 42. and are not allowed to be overruled. This means that the lighting system 41 will continue to stream effects as intended, independently of what the lighting system 42 is doing. Settings of another lighting device in the same room, e.g. lighting device 32, may also be closed.
- The same algorithm determines that settings affecting lighting devices in adjacent rooms, e.g. lighting device 33 in the kitchen, are not critical; if their settings would be overruled, in the current situation (the user streaming), the experience for the user would not be degraded. Therefore, the bridge 1 may set or keep the settings for lighting device 33 to "open". This means that a request from another smart home system, e.g. lighting system 42, to modify the settings of lighting device 33 will be accepted.
- Finally, the algorithm running on the bridge 1 can also establish that some device settings are simply "static", meaning that they are always open or closed and cannot be changed by the said algorithm in the bridge 1, e.g. because they are deemed to be either too specific to the system (e.g. manufacturer specific settings that other systems would simply not understand or misuse), or because they represent a bigger impact to the user if changed (for example, the reaction time of sensors for turning the lights on at night).

The processor 5 may be configured to indicate to the second connected lighting system 42 proactively or on request which settings of each of the devices of the lighting system 41 have which level of access. The level of access is dependent on the user impact. The levels of access may be "not allowed", "allowed", or "temporarily allowed", for example. In the example of FIG. 1, only the state of the lighting devices 31-33 is determined. When the system comprises other devices, e.g. motion sensors, the state of these other devices may also be determined.

The Internet server 14 of the second connected lighting system 42 runs an algorithm that can determine settings for the lighting devices 31-33 of the first connected lighting system 41. Continuing with the above example, the Internet server 14 is not able to change the settings of lighting devices 31 and 32 while the lighting system 41 is in entertainment mode. However, the Internet server 14 is able to change the settings of lighting device 33 by communicating with the Internet server 13 of the lighting system 41.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise solid-state memory, for example. The memory 7 may be used to store a table of connected lights, for example.

The receiver 3 and the transmitter 4 may use one or more wired or wireless communication technologies, e.g. Ethernet for communicating with the wireless LAN access point 17 and Zigbee for communicating with the lighting devices 31-33, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

Figure 2:
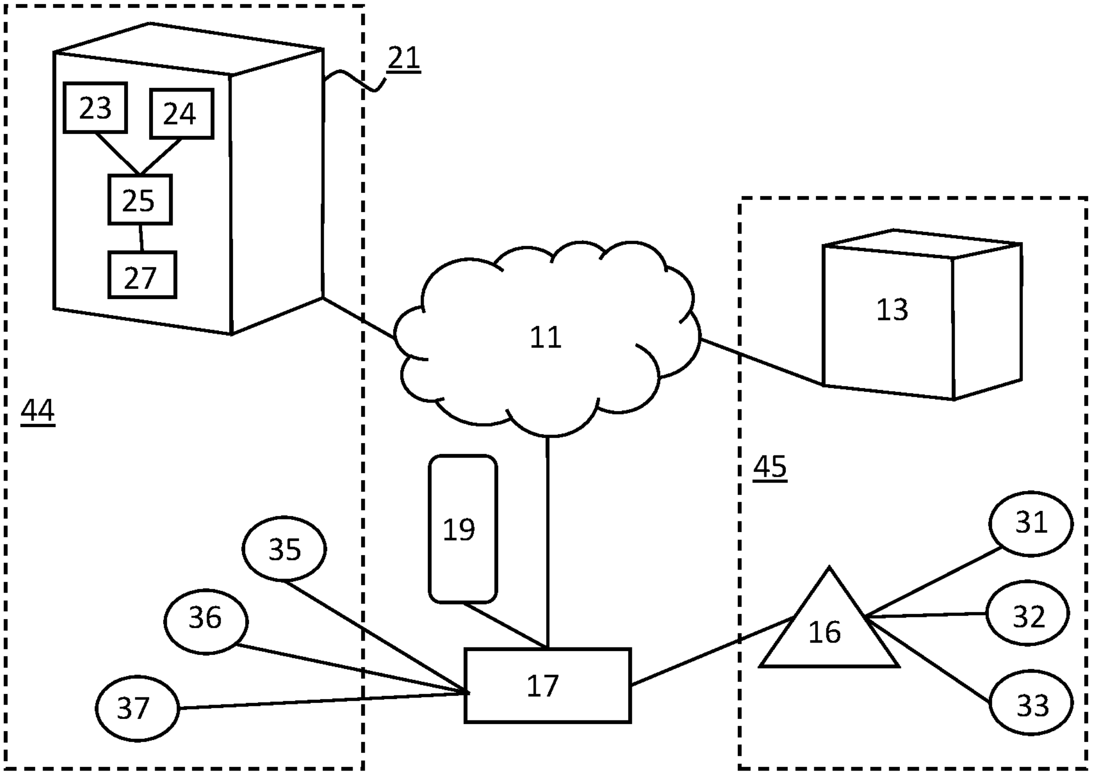
FIG. 2 is a block diagram of a second embodiment of the system.

FIG. 2 shows a second embodiment of the (control) system for preventing or limiting control of a lighting device in a first connected lighting system 44. The (control) system may be a single device or may comprise multiple devices. The (control) system is typically part of the first connected lighting system. In this second embodiment, the (control) system is a cloud service 21. The cloud service 21 is connected to the Internet (backbone) 11. The cloud service 21 is part of a lighting system 44. The lighting system 44 is similar to lighting system 42 in that it comprises lighting devices 35-37 and does not comprise a bridge, but Internet server 14 of FIG. 1 has been replaced with Internet server 21. The lighting devices 35-37 may be WiZ lights, for example. Other smart home systems are able to control the lighting devices 35-37 via the Internet server 21.

In the example of FIG. 2, a second connected lighting system 45 is located in the same building as the first connected lighting system 44. The second connected lighting system 45 is similar to lighting system 41 in that it comprises lighting devices 31-33 and Internet server 13, but bridge 1 of FIG. 1 has been replaced with a bridge 16. The lighting devices 31-33 may be Philips Hue lights, for example.

The cloud service 21 comprises a receiver 23, a transmitter 24, a processor 25, and storage means 27. The processor 25 is configured to determine a current or expected state of the lighting devices 35-37, determine control permissions based on the current or expected state of the lighting devices 35-37, and prevent or limit control of the lighting device by the second connected lighting system 45 in dependence on the control permissions. Thus, in the embodiment of FIG. 2, the algorithm running on bridge 1 of FIG. 1 runs on Internet server 21 and the algorithm running on Internet server 14 of FIG. 1 runs on bridge 16.

In the embodiment of the cloud service 21 shown in FIG. 2, the cloud service 21 comprises one processor 25. In an alternative embodiment, the cloud service 21 comprises multiple processors. The processor 25 of the cloud service 21 may be a general-purpose processor, e.g. from Intel or AMD, or an application-specific processor. The processor 25 of the cloud service 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to connect to the Internet 11, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The cloud service 21 may comprise other components typical for a cloud service such as a power connector. The invention may be implemented using a cloud service program running on one or more processors.

Figure 3:
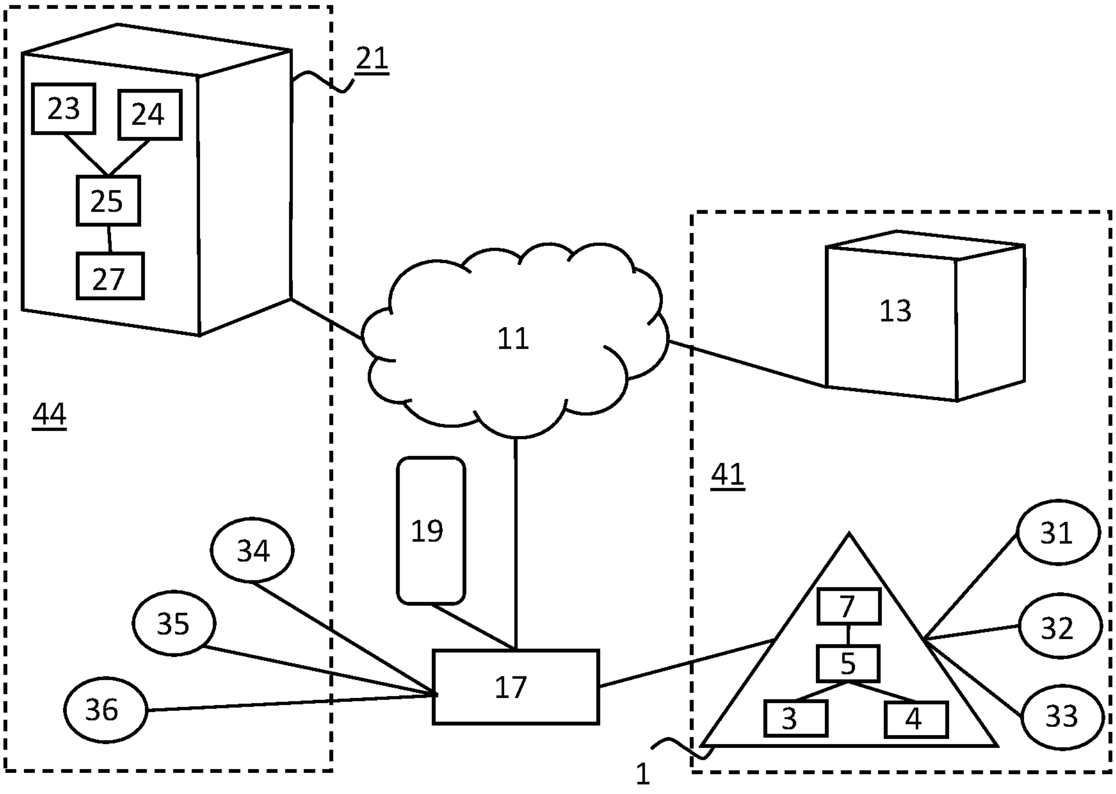
FIG. 3 shows the embodiments of FIGS. 1 and 2 being used together in the same building.

In the embodiments of FIGS. 1 and 2, the system of the invention comprises a bridge or a cloud service. In an alternative embodiment, the system of the invention is a different device, e.g. another device in the building such a personal computer or a mobile phone. In the embodiments of FIGS. 1 and 2, the system of the invention comprises a single device. In an alternative embodiment, the system of the invention comprises a plurality of devices. FIG. 3 shows the embodiments of FIGS. 1 and 2 being used together in the same building.

Figure 4:
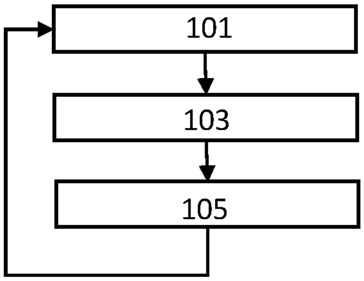
FIG. 4 is a flow diagram of a first embodiment of the method.

A first embodiment of the method of preventing or limiting control of a lighting device in a first connected lighting system is shown in FIG. 4. The method may be performed by the bridge 1 of FIG. 1 or the Internet server 21 of FIG. 2, for example. A step 101 comprises determining a current or expected state of the lighting device. Step 101 may comprise determining an expected state of the lighting device from an automation defined in the first connected lighting system, for example. For example, if the lighting device is used for a fall asleep routine or an alarm, control by other lighting systems may be prevented, as this would be disruptive. On the other hand, if the lighting device is used for a presence mimicking (security) routine, control by other lighting systems may be allowed, as this would not be disruptive.

The current or expected state of the lighting device influences which kind of light effects the lighting device renders or will render. For example, the current or expected state of the lighting device may comprise the lighting device rendering light effects to accompany audio and/or video content being rendered on an audio and/or video rendering device or the lighting device rendering dynamic light effects. In these cases, allowing the second connected lighting system to change the light settings of the lighting device would normally be disruptive.

A step 103 comprises determining control permissions based on the current or expected state of the lighting device as determined in step 101. A step 105 comprises preventing or limiting control of the lighting device by a second connected lighting system located in a same building as the first connected lighting system in dependence on the control permissions determined in step 103. The second connected lighting system is located in the same building as the first connected lighting system when at least their lighting devices are located in the same building. Step 101 is repeated after step 105, after which the method proceeds as shown in FIG. 4.

If the second connected lighting system tries to control the lighting device, it may be informed that control is not possible. In an alternative embodiment, the second connected lighting system is information that control of the lighting device is not possible or restricted.

Figure 5:
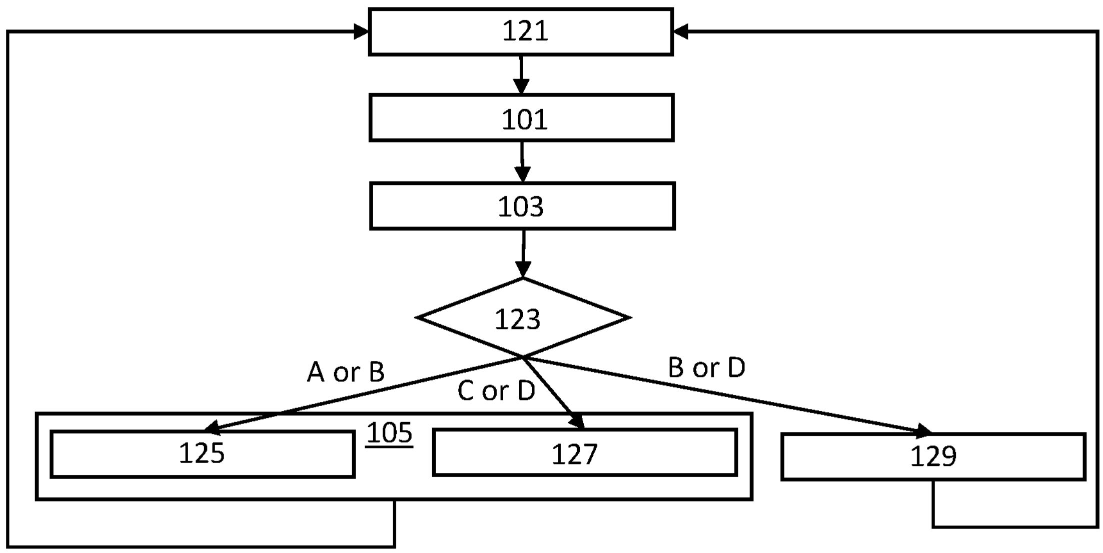
FIG. 5 is a flow diagram of a second embodiment of the method.

A second embodiment of the method of preventing or limiting control of a lighting device in a first connected lighting system is shown in FIG. 5. The method may be performed by the bridge 1 of FIG. 1 or the Internet server 21 of FIG. 2, for example. A step 121 comprises selecting one of the lighting devices from the one or more lighting devices in the first connected lighting system. In the first iteration of step 121, a first lighting device is selected from these lighting devices. Next, step 101 comprises determining a current or expected state of the lighting device selected in step 121. Step 103 comprises determining control permissions based on the current or expected state of the lighting device as determined in step 101.

A step 123 comprises determining which control permissions have been determined in step 103. Depending on which control permissions have been determined, one or more of steps 125, 127, and 129 are performed. Control permissions A result in step 125 being performed. Control permissions B result in steps 125 and 129 being performed. Control permissions C result in step 127 being performed. Control permissions D result in steps 127 and 129 being performed.

Step 125 comprises temporarily preventing or temporarily limiting control of the lighting device by a second connected lighting system. The second connected lighting system is located in the same building as the first connected lighting system when at least their lighting devices are located in the same building. When informing the second connected lighting system of the control permission, timing indications may be provided. For example, a lighting device in the bedroom might be allowed to be controlled but with an indication that this will remain as such only for the next two hours or until 10 pm, for example. These timing indications may be determined in step 103, e.g. if the controller of the lighting system knows that at that moment a go-to-bed routine should be started, which should not be overruled by a third party system.

Step 127 comprises preventing or limiting control of the lighting device by the second connected lighting system for an indefinite time period. Step 125 and/or step 127 may comprise preventing one or more characteristics of light effects rendered by the lighting device from being changed by the second connected lighting system. For example, the second connected lighting system may be allowed to change a color of the lighting device but not a dim level/brightness setting of the lighting device.

Step 129 comprises preventing or limiting control of the lighting device by one or more controlling devices in the first connected lighting system. Examples of such a controlling device are a mobile device or an Internet server. A mobile device may be part of both the first connected lighting system and the second connected lighting system, e.g. if it runs a first software application for controlling lighting devices in the first connected lighting system and a second software application for controlling lighting devices in the second connected lighting system.

Step 101 is repeated after step 125 or 127, and optionally step 129, has/have been performed, after which the method proceeds as shown in FIG. 5. In the next iteration of step 121, a next lighting device is selected from the one or more lighting devices in the first connected lighting system. If control permissions have been determined and implemented for all lighting devices, the process may be repeated for the first lighting device in the first connected lighting system, as the current or expected state of the first lighting device may have changed.

Figure 6:
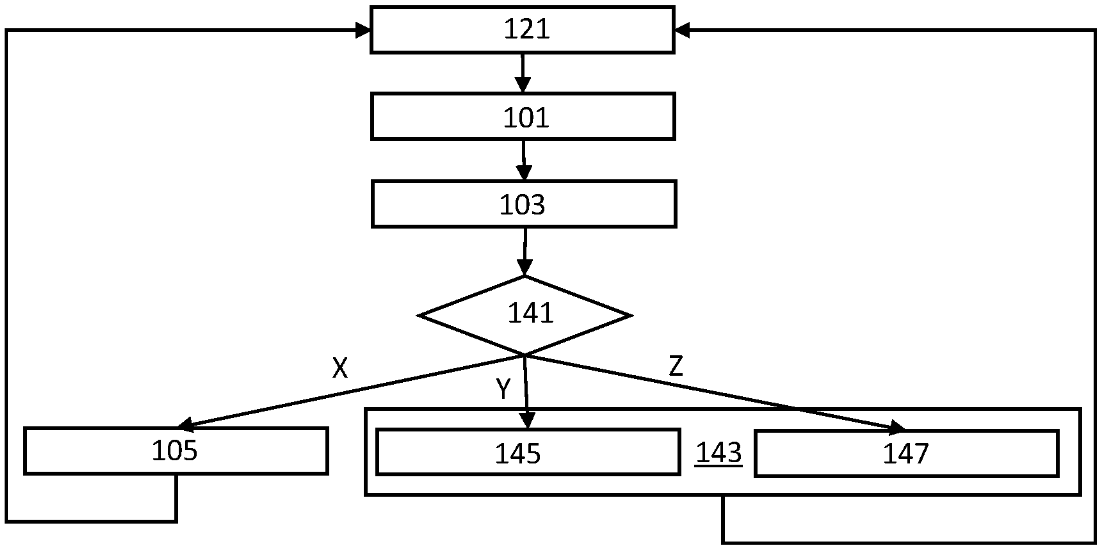
FIG. 6 is a flow diagram of a third embodiment of the method.

A third embodiment of the method of preventing or limiting control of a lighting device in a first connected lighting system is shown in FIG. 6. The third embodiment of FIG. 6 is a variation on the second embodiment of FIG. 5. In the embodiment of FIG. 6, step 123 of FIG. 5 has been replaced with a step 141 and step 129 of FIG. 5 has been replaced with a step 143. Step 143 is implemented by steps 145 and 147. Furthermore, in the embodiment of FIG. 6, step 105 is not implemented by steps 125 and 127.

Step 141 comprises determining which control permissions have been determined in step 103. Depending on which control permissions have been determined, step 105, 145, or 147 is performed. Control permissions X result in step 105 being performed. Control permissions Y result in step 145 being performed. Control permissions Z result in step 147 being performed.

Step 105 comprises preventing or limiting control of the lighting device by the second connected lighting system, which is located in a same building as the first connected lighting system. Step 143 comprises granting the second connected lighting system control of the lighting device. Step 145 comprises temporarily granting the second connected lighting system control, e.g. exclusive control, of the lighting device. Step 147 comprises granting the second connected lighting system control of the lighting device for an indefinite time period.

Figure 7:
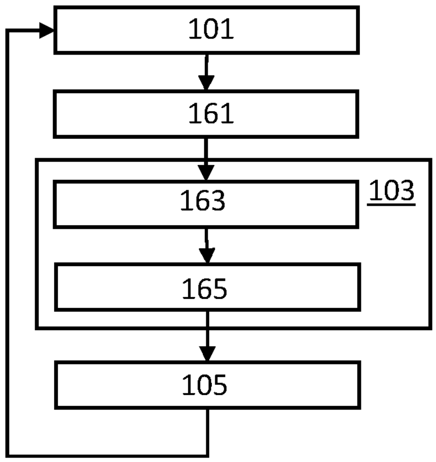
FIG. 7 is a flow diagram of a fourth embodiment of the method.

A fourth embodiment of the method of preventing or limiting control of a lighting device in a first connected lighting system is shown in FIG. 7. The method may be performed by the bridge 1 of FIG. 1 or the Internet server 21 of FIG. 2, for example. Step 101 comprises determining a current or expected state of the lighting device.

A step 161 comprises receiving a signal indicative of a desired state of the lighting device. The desired state is specified in a control command from the second connected lighting system. The signal may comprise this control command, for example. Step 103 comprises determining control permissions based on the current or expected state of the lighting device as determined in step 101. In the embodiment of FIG. 7, step 103 is implemented by steps 163 and 165.

Step 163 comprises determining an impact of a change from the current or expected future state to another state, and more specifically, determining an impact of a change from the current or expected future state to the desired state indicated in the signal received in step 161. The impact typically depends on whether a user expects something to happen and/or whether and/or whether an event would not be reacted to. In the embodiment of FIG. 7, the impact also depends on a difference in dim level/brightness, color, and/or intensity (e.g. dynamicity) between the current or expected state and the desired state. Step 165 comprises determining control permissions based on the impact of the change as determined in step 163.

Step 105 comprises preventing or limiting control of the lighting device by a second connected lighting system located in a same building as the first connected lighting system in dependence on the control permissions as determined in step 103. The second connected lighting system is located in the same building as the first connected lighting system when at least their lighting devices are located in the same building.

The embodiments of FIGS. 4 to 7 differ from each other in multiple aspects, i.e. multiple steps have been added or replaced. In variations on these embodiments, only a subset of these steps is added or replaced and/or one or more steps is omitted. For example, step 129 may be omitted from the embodiment of FIG. 5 and/or added to the embodiments of FIG. 4, 6, and/or 7. Multiple, e.g. all, of the embodiments of FIGS. 4 to 7 may be combined.

Figure 8:
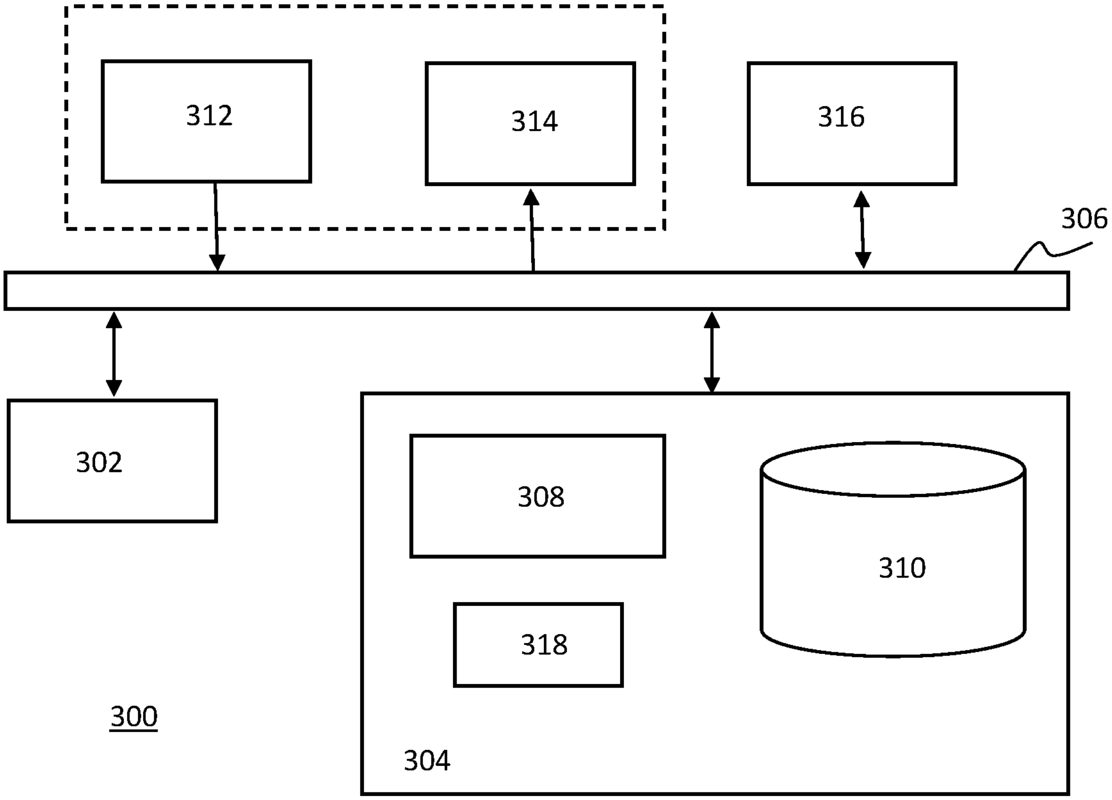
FIG. 8 is a block diagram of an exemplary data processing system for performing the method of the invention.

FIG. 8 depicts a block diagram illustrating an exemplary data processing system that may perform the method as described with reference to FIGS. 4 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 8 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for preventing or limiting control of a lighting device in a first connected lighting system, said system comprising at least one processor configured to:

determine a current or expected state of said lighting device, determine control permissions based on said current or expected state of said lighting device, and prevent or limit control of said lighting device by a second connected lighting system located in a same building as said first connected lighting system in dependence on said control permissions.

2. A system as claimed in claim 1, wherein said at least one processor is configured to temporarily prevent or temporarily limit control of said lighting device by said second connected lighting system in dependence on said control permissions.

3. A system as claimed in claim 1, wherein said at least one processor is configured to prevent one or more characteristics of light effects rendered by said lighting device from being changed by said second connected lighting system in dependence on said control permissions.

4. A system as claimed in claim 1, wherein said at least one processor is configured to grant said second connected lighting system control of said lighting device in dependence on said control permissions.

5. A system as claimed in claim 4, wherein said at least one processor is configured to grant said second connected lighting system exclusive control of said lighting device in dependence on said control permissions.

6. A system as claimed in claim 4, wherein said at least one processor is configured to temporarily grant said second connected lighting system control of said lighting device in dependence on said control permissions.

7. A system as claimed in claim 1, wherein said at least one processor is configured to further prevent or limit control of said lighting device by one or more controlling devices in said first connected lighting system.

8. A system as claimed in claim 1, wherein said at least one processor is configured to:

determine an impact of a change from said current or expected future state to another state, and determine said control permissions based on said determined impact of said change.

9. A system as claimed in claim 8, wherein said at least one processor is configured to:

receive a signal indicative of a desired state of said lighting device, said desired state being specified in a control command from said second connected lighting system, and determine said impact of said change by determining an impact of a change from said current or expected future state to said desired state.

10. A system as claimed in claim 1, wherein said at least one processor is configured to:

determine a current or expected further state of a further lighting device in said first connected lighting system, and determine said control permissions further based on said current or expected further state of said further lighting device.

11. A system as claimed in claim 1, wherein said current or expected state of said lighting device influences which kind of light effects said lighting device renders or will render.

12. A system as claimed in claim 11, wherein said current or expected state of said lighting device comprises said lighting device rendering light effects to accompany audio and/or video content being rendered on an audio and/or video rendering device or said lighting device rendering dynamic light effects.

13. A system as claimed in claim 1, wherein said at least one processor is configured determine said expected state of said lighting device from an automation defined in said first connected lighting system.

14. A method of preventing or limiting control of a lighting device in a first connected lighting system, said method comprising:

determining a current or expected state of said lighting device;

determining control permissions based on said current or expected state of said lighting device; and preventing or limiting control of said lighting device by a second connected lighting system located in a same building as said first connected lighting system in dependence on said control permissions.

15. A computer program product for a computing device, the computer program product comprising computer program code to perform the method of claim 14 when the computer program product is run on a processing unit of the computing device.

* * * * *